April 25, 1939.  V. ANDERSON ET AL  2,155,388
COIL FILAMENT MANUFACTURE
Filed Oct. 15, 1937  6 Sheets-Sheet 4
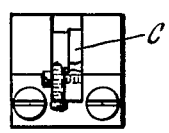
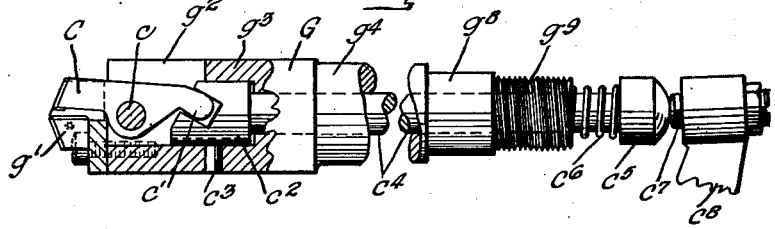
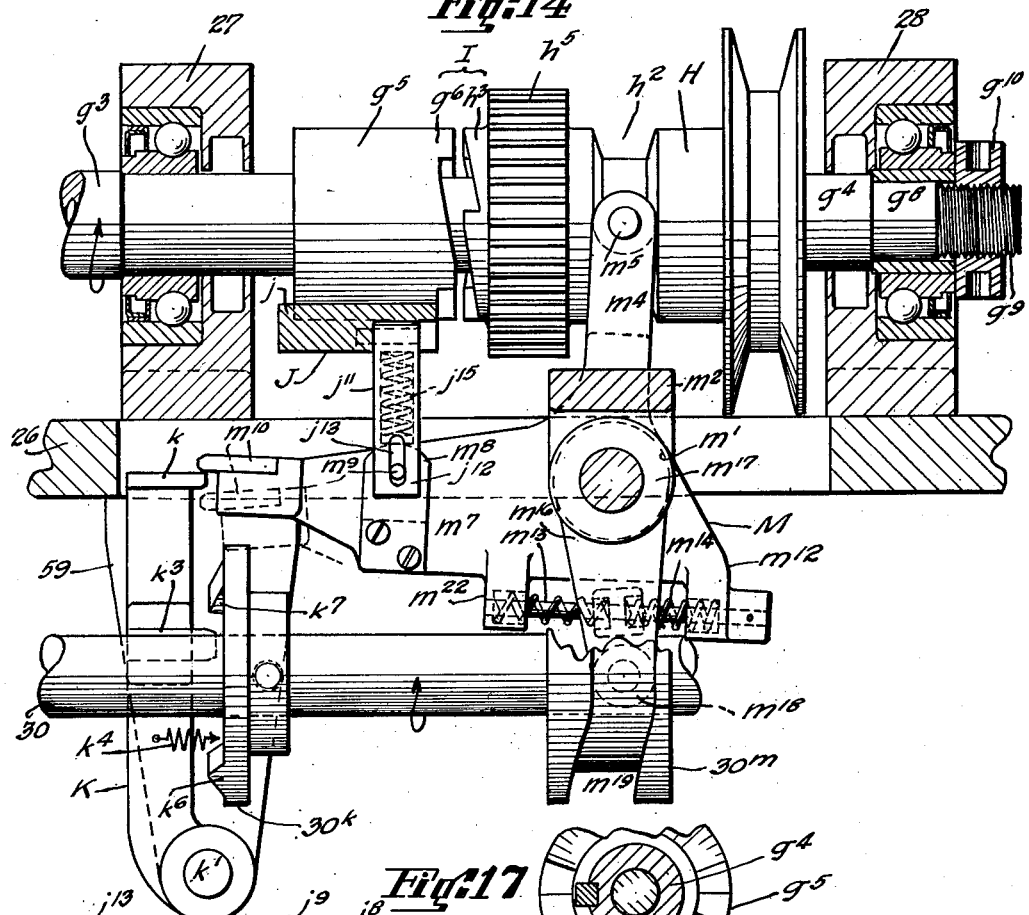
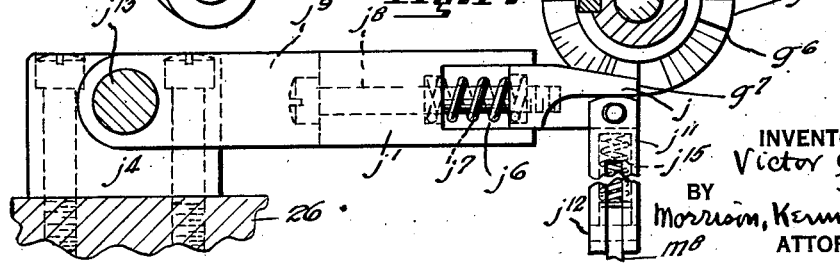
INVENTORS:
Victor Anderson &
D. G. Trutner
BY
Morrison, Kennedy & Campbell
ATTORNEYS.

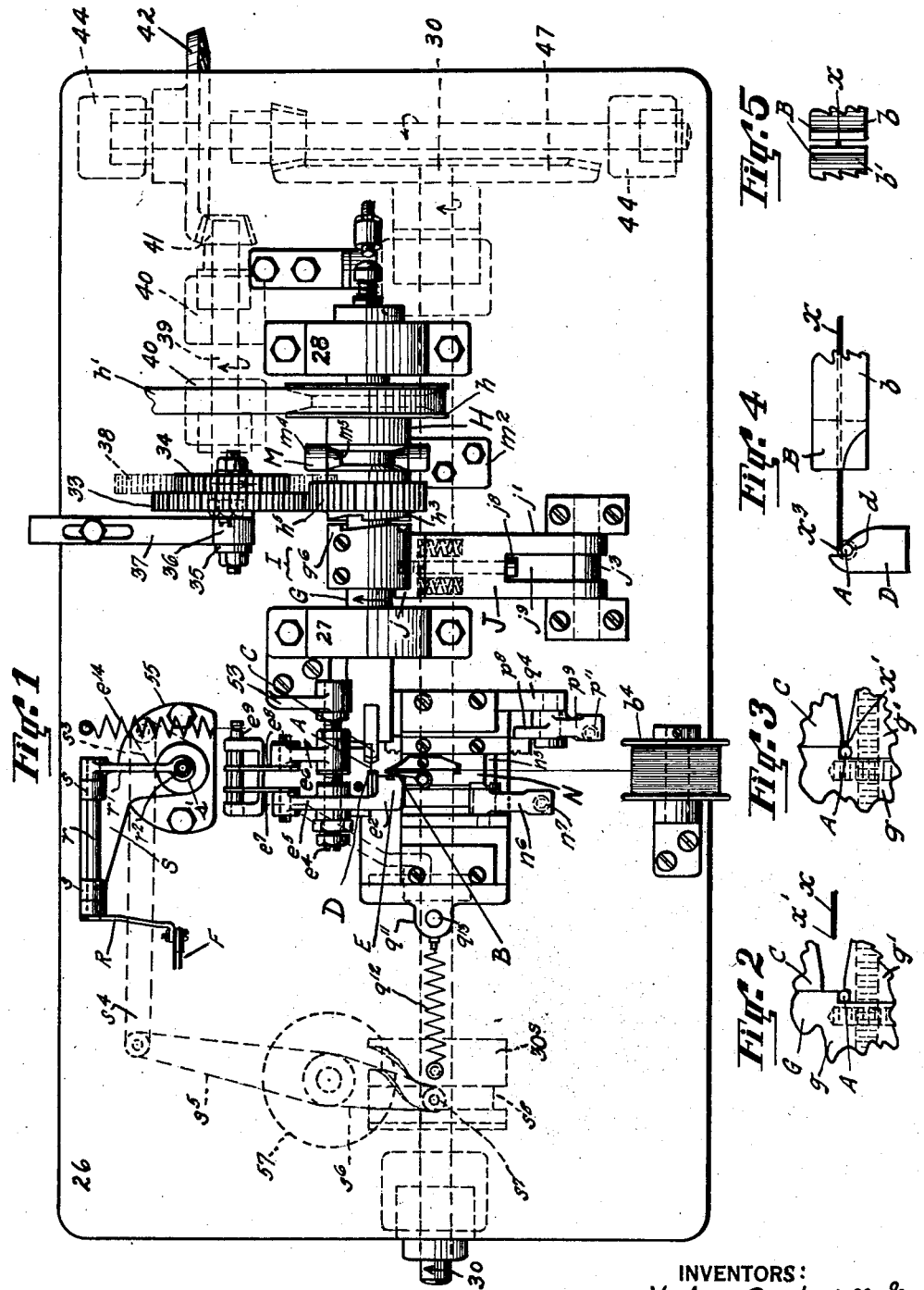

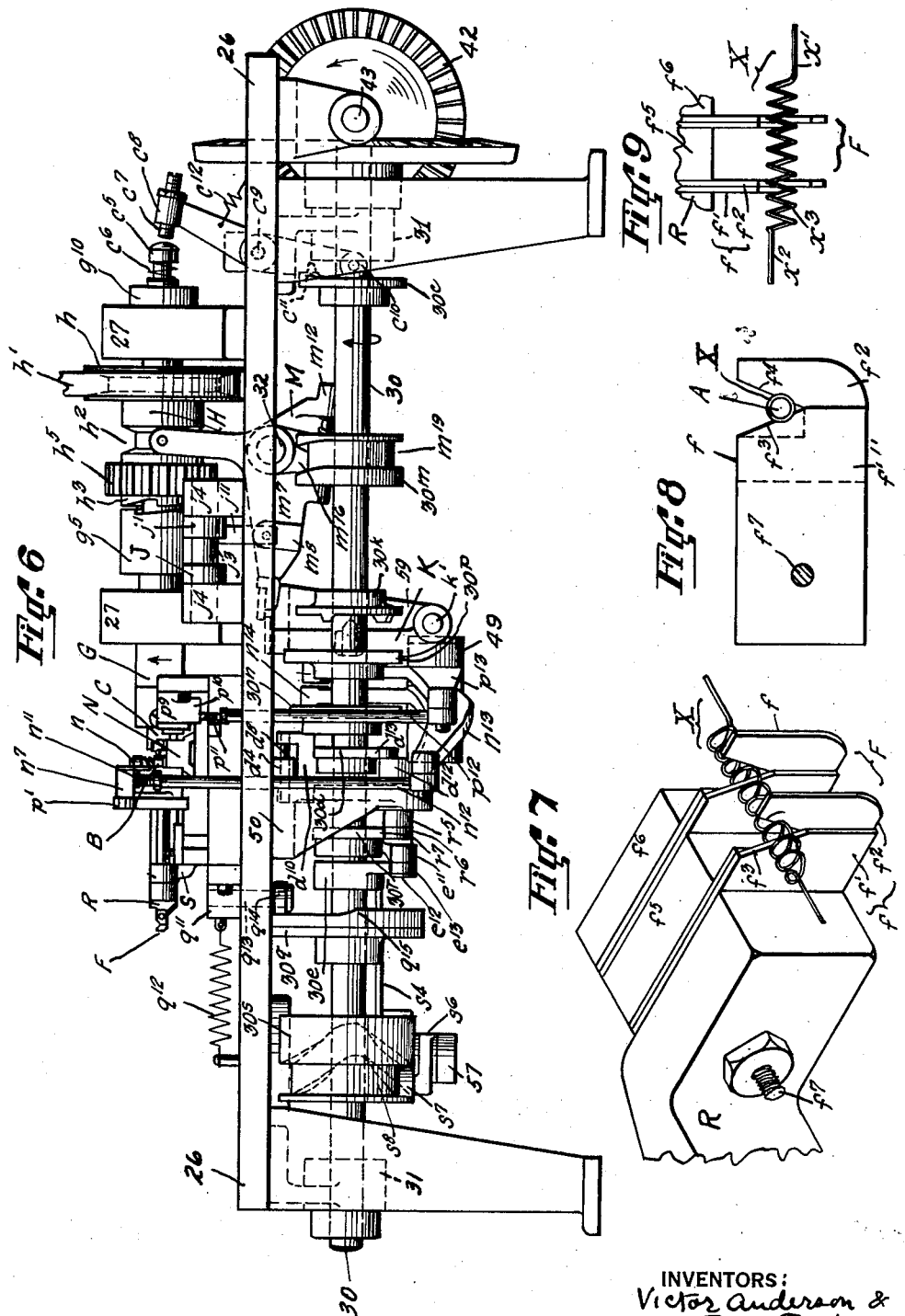

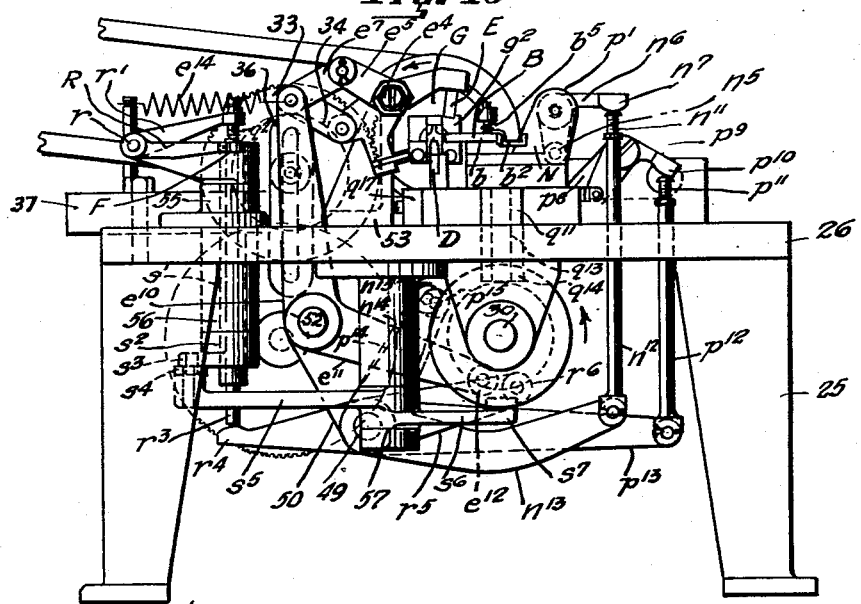

April 25, 1939.  V. ANDERSON ET AL  2,155,388
COIL FILAMENT MANUFACTURE
Filed Oct. 15, 1937   6 Sheets-Sheet 5
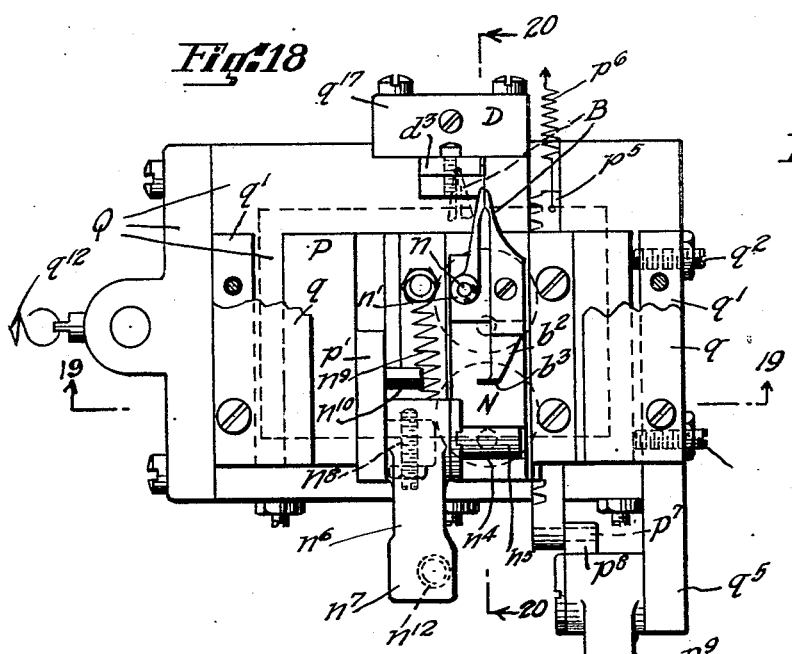
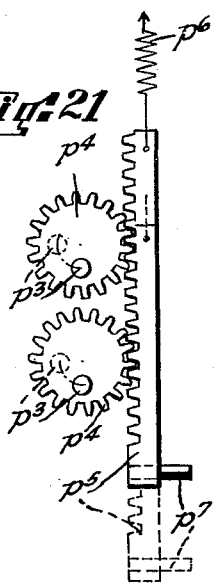
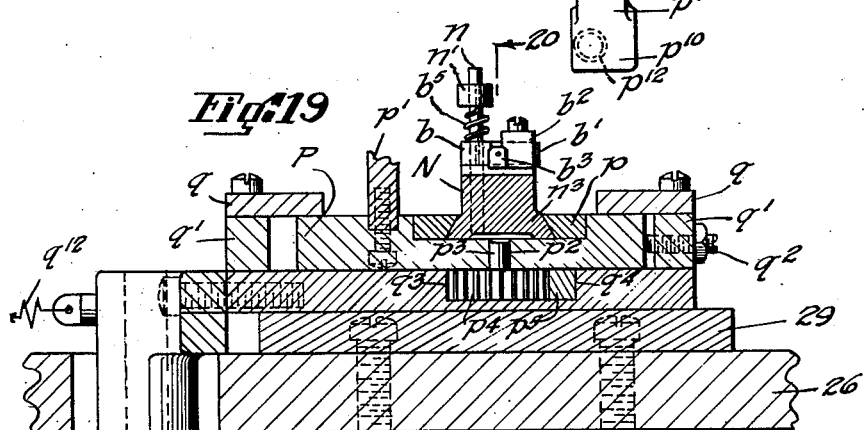
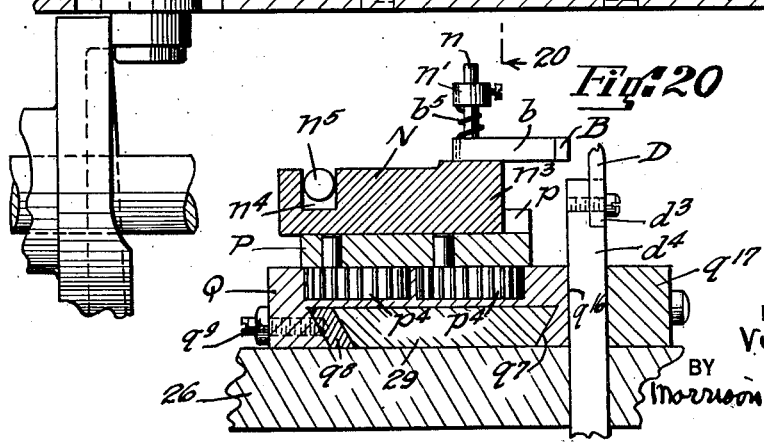
INVENTORS:
Victor Anderson &
D. G. Trutner
BY Morrison, Kennedy & Campbell
ATTORNEYS.

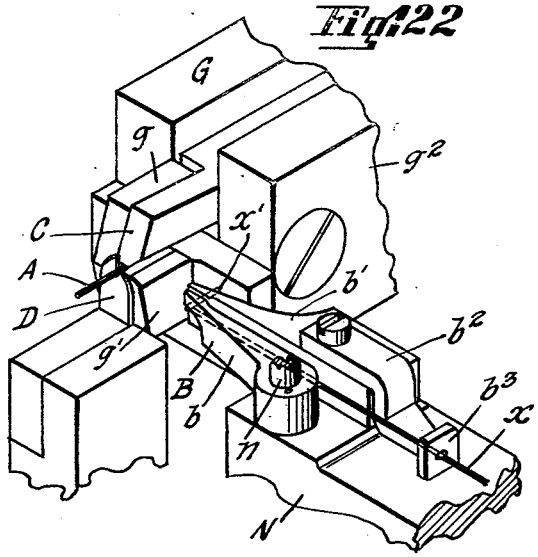
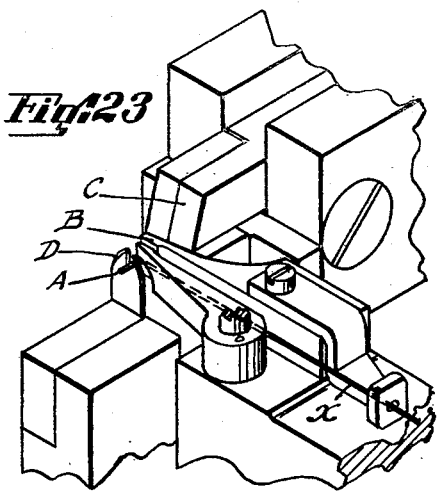
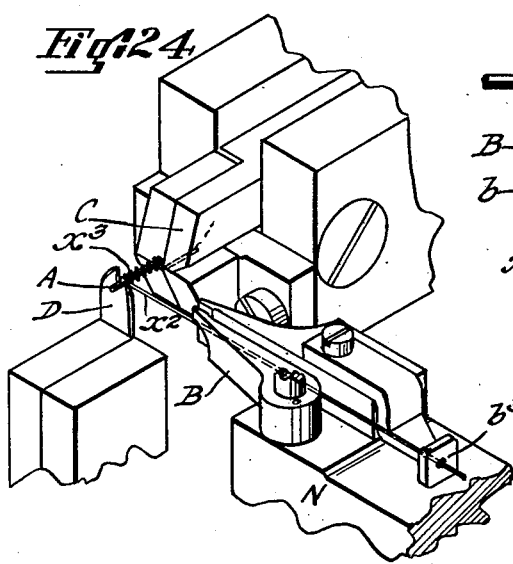
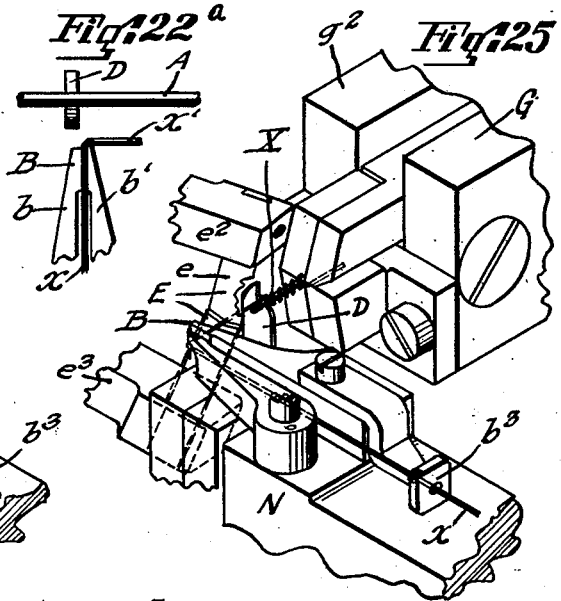
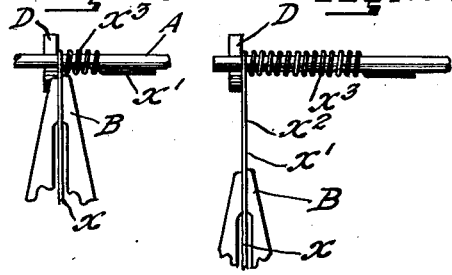
INVENTORS:
Victor Anderson &
D. G. Trutner
BY Morrison, Kennedy & Campbell
ATTORNEYS.

UNITED STATES PATENT OFFICE 2,155,388

COIL FILAMENT MANUFACTURE

Victor Anderson, Cliffside Park, and Donald G. Trutner, North Arlington, N. J., assignors to Alfred Hofmann & Company, West New York, N. J., a corporation of New Jersey Application October 15, 1937, Serial No. 169,226

33 Claims. (Cl. 153—67)

This invention relates to coil filament manufacture, and involves both the novel machine and the novel method herein disclosed, involving steps comprising the winding of the filament wire into a helix upon a mandrel or arbor, and associated operations on the wire and product. The invention pertains particularly to the production of helical coils having end extensions or leads and suitable to form the filaments of electric lamps of various kinds, and the invention is herein shown adapted more especially for producing filaments with helixes of quite small diameter wound from very fine wire and adaptable for miniature lamps.

The general object of the invention is to afford an efficient and reliable mode of and means for handling and forming the wire into helixes with extension ends, for filament purposes, especially the extremely fine diameter of wire employed in automobile and other small lamps. A further general object is to bring about winding and associated operations in quick sequence for rapid production and large output. A particular object is to so handle the filament wire as to produce helical coils each having at each end a straight and free longitudinal extension or stretch, beyond the helix, available as a lead for mounting the coil in the lamp. Another object is to combine cooperating means and method steps for supplying and disposing the wire and winding it, and preferably automatically severing each wound filament, in a rapid and accurate manner. Another object is to provide an efficient method and means for outfeeding the delicate products by engaging and sliding them from the mandrel and transporting them away to a point of delivery, or for transfer directly to a mounting means, without injury. Another object is to afford for these operations a machine or combination mechanism that will be smooth running, relatively simple in structure for the many actions required, and rugged and durable.

Other and further objects and advantages of the present invention will be explained in the hereinafter following description of an illustrative embodiment of the invention or will be manifest to those conversant with the subject. To the attainment of such objects and advantages the present invention consists in the novel filament coil making method and machine, and the novel features of operation, combination, arrangement and construction herein illustrated or described.

In the accompanying drawings, on Sheet 1, Fig. 1 is a top plan view of a filament or coil making machine embodying the present invention; the parts being shown in that stage of operation following the step numbered 6 in the complete cycle of operations as hereinafter explained. Figs. 2, 3 and 4 are detached left or end elevations of the winding mandrel and certain adjacent parts, at different stages of operation; Fig. 2 showing the initial position, preceding step 1, Fig. 3 showing the position succeeding step 2, the wire being gripped, and Fig. 4 showing the position succeeding step 6. Fig. 5 is a detached rear elevation of the wire guide, that is, looking from the left side of Fig. 4.

For convenience of description the side of the machine nearest the observer in Fig. 1 will be termed the front, thus locating the rear, right and left; but these terms are used only relatively since the arrangements may be altered at will. The terms in and out will usually designate movements toward and from the mandrel or the axis of winding, the wire guide thus advancing inwardly to the mandrel and later retracting outwardly or frontwardly. The advancing travel of the wire guide along the mandrel will be termed the feed, its speed in relation to the rotation rate determining the pitch of the produced helix.

On Sheet 2 of the drawings, Fig. 6 is a front elevation of the machine of Fig. 1, with the parts in the same position. Figs. 7, 8 and 9 are detached views of the outfeeding device, Fig. 7 being a perspective showing how the outfeeder carries the finished product, Fig. 8 being a left elevation of the same parts showing also the winding mandrel before the coil has been extracted, and Fig. 9 being a top plan view of the same parts, without the mandrel; these three figures being on a much enlarged scale, and showing also the preferred general character of the completed filament or coil, although in practice it would usually have more convolutions and relatively smaller pitch and longer ends or leads.

On Sheet 3, Fig. 10 is a left elevation of the machine of Figs. 1 and 6, on the same scale, but with the underneath actuating connections for the mandrel rest wholly omitted as these are shown in Fig. 11. Fig. 11 is an enlarged perspective view of the mandrel rest, its mounting and its actuating connections and shaft cam. Fig. 12 is a left elevation on an enlarged scale of the severing device or shear and part of its actuating connections, shown in closed position, and in dotted lines shown open. Fig. 13 is a detailed view of the cutter blades on a further enlarged scale looking in the direction of the arrow 13 of Fig. 12.

On Sheet 4, Fig. 14 is a front elevation of certain driving parts, and a part of the spindle or rotor which carries the mandrel, and the clutch and stop and shift means therefor, certain parts being shown in vertical central section. Fig. 15 is a front elevation, partly broken away, of the rotary spindle, the wire gripper and the interior means for operating the gripper. Fig. 16 is a left elevation of the parts shown in Fig. 15. Fig. 17 is a right elevation of the spindle stop device. Figs. 14 to 17 show the parts in initial position.

On Sheet 5, Fig. 18 is a top view, in the same stage of operation as Fig. 1 but on a larger scale, of the wire guide and the several shiftable parts upon which it is mounted. Fig. 19 is a vertical sectional view, looking from the front, taken on the line 19—19 of Fig. 18. Fig. 20 is a vertical sectional view looking from the right, taken on the vertical line 20—20 of Fig. 18 or 19. Fig. 21 is a top plan view of certain interior parts shown in Figs. 18 to 20.

On Sheet 6, Figs. 22 to 25 are a series of diagrams in enlarged perspective showing certain of the stages of operation in the winding and severing of each product; Fig. 22 showing the initial position of the cycle, Fig. 23 showing the position of the parts following step 4, Fig. 24 showing the position following step 6, and Fig. 25 showing the position of the parts following step 8. The adjacent Figs. 22$^a$ to 25$^a$ are diagrams in top plan view showing the positions of the active instruments at stages corresponding to Figs. 22 to 25 respectively.

Reference will first be made to the product and to the active instruments that operate directly upon the wire or product. Figs. 7, 8, 9 and 25 best show the coiled filament X, completed and severed. It is formed from an indefinite source or supply wire $x$ seen in Figs. 4 and 22–25. This invention shapes the supplied wire into successive products, one per cycle, each having a first wire lead or extended end $x'$ at the right, a second such end $x^2$ at the left, and the helix $x^3$ between them. The forming instruments comprise:

A, the winding mandrel, chucked at its right end for rotation during the winding period of each cycle, but free or disengageable at its other end for removal of product.

B, the wire guide, movable in several ways, inwardly for presenting the wire to the mandrel, feeding leftward during winding while supplying wire, and then withdrawing in a manner to supply a straight wire stretch, and shifting to bend the wire stretch as will be described.

C, the wire gripper located near the chucked end of the mandrel and adapted to hold the first end $x'$ during the winding of each coil, representing any suitable holder.

D, the mandrel rest in the nature of a disengageable bearing or underneath support for the mandrel, having feed travel with winding progress, acting as an abutment or shoulder in the bending of the straight wire extension and retractible for removal of product from the mandrel.

E, the severer or shear device, operable to shift inward for cutting the straight wire extension into leads $x'$ and $x^2$, and then retractible.

F, the outfeeder or instrument for engaging and sliding each product from the free end of the mandrel, having a series of movements for this action and, to transport and deliver each filament.

The method and operation may conveniently be described with reference only to these six instruments. In what may be considered the initial position, the mandrel A is held stopped against rotation, the wire guide B is fully retracted frontward and rightward, the wire gripper C is open, the mandrel rest or bearing D is up and supports the mandrel preferably near its chucked end, the severer E is retracted and open, and the outfeeder F is retracted. Figs. 2, 14, 15, 16, 17, 22 and 22$^a$ show this stage. The following steps or actions occur during each cycle of three seconds more or less, naturally with considerable overlapping of movements, but preferably in substantially the order stated, namely:

1. The wire guide B moves in, carrying and presenting the wire to the right end of the mandrel A, the wire end having been previously bent parallel to the mandrel.

2. This motion has brought the wire end $x'$ into the gripper C, and the gripper now closes upon the wire, holding it firmly for the winding; Figs. 2 and 3 showing the gripper open and closed respectively.

3. The mandrel is next set into rotation by a clutching operation, carrying with it the gripper, thus starting the winding of the wire upon the mandrel, the wire being thereby drawn through the guide from the supply.

4. During the winding of the desired number of convolutions the wire guide advances or feeds leftward steadily, at a speed to produce the desired pitch of helix, the pitch exceeding the diameter of the wire thereby to form an open coil; and the mandrel rest or bearing D is carried leftward with this feed movement of the guide; Figs. 23 and 23$^a$ show the winding in progress.

5. At the end of the winding the mandrel is stopped in rotation, preferably in a predetermined position thus insuring uniform operation and results.

6. The wire guide next retracts outward or withdraws frontward, so that the wire, which is under tension, is thereby drawn through the guide, this motion being sufficient to supply a double length of straight wire forming a straight stretch equal to the sum of the two ends or leads $x'$ and $x^2$; this stage of operation being illustrated in Figs. 1, 4, 6, 10, 11, 18 to 21 and the diagrams Figs. 24 and 24$^a$.

7. The wire guide next undergoes a compound motion for bending the straight wire length into substantial parallelism with the winding axis, namely, it shifts around leftward and inward toward the axis, preferably in an arc of about 90°, the straight stretch being thus bent around the mandrel rest, now located adjacent the final helix convolution; the guide preferably undergoing no rotation or swing during this shift.

8. The severer or shear device E, having already commenced its inward shift, next reaches the extended stretch of straight wire, and closes upon it to cut it substantially midway, leaving the free length or lead $x^2$ on the completed product and a similar length $x'$ in the guide ready for the next cycle; Fig. 12 shows this position, as do the diagrams Figs. 25 and 25$^a$; the shear being representative of any severing means.

9. After severing, the shear retracts to make room for other operations, and the rest retracts or lowers to disengage the mandrel and so permit outfeed, and the wire guide shifts around front and right to its position preceding step 7.

10. Overlapping these actions the outfeeder F has approached, and it now comes to position beneath the product on the mandrel.

11. The outfeeder next rises to engage delicately the product, as Fig. 8 shows; and the wire gripper either now or earlier has opened to release the product.

12. The outfeeder next retracts leftward, sliding the coil from the mandrel and holding it, and then swings out and away as rearwardly for delivery of the product; Figs. 7 and 9 may be considered as showing this position, as do Figs. 1, 6 and 10.

13. During or before step 12 the wire guide has returned completely rightward to initial position and the rest has risen again into initial mandrel supporting position, and the parts are ready for repetition of cycle.

Referring now to the illustrated structure, the general parts will be mainly designated by reference numbers, while special operating elements and their connections will be designated by letters, similar letters thus running through a connected train of parts.

The general Figures 1, 6 and 10 show that the machine stands on corner legs 25 which support a horizontal table 26. In general the table carries above it the instruments A to F operating upon the wire product, and many cooperating machine elements, while the operating cams and many connections and elements are located below the table. Among the general parts on top of the table are bearings 27 and 28 for the spindle G which carries the mandrel and gripper.

The rotor or spindle G is a long shaft-like element, shown in detail in Figs. 14 to 17, rotating in the bearings 27, 28. The mandrel A is chucked axially in the extreme left end of the spindle as best shown in Figs. 2, 3, 22-25. The spindle thus has a leftward extension or chuck jaw $g$ at the rear side of the axis, as Fig. 2 shows, with a shoulder or recess receiving the mandrel, which is there clamped by an adjustable chuck piece or jaw $g'$ secured to the spindle by screws. The spindle thus serves as a rotor, turning the mandrel during the winding period of each cycle and having drive and stop means for this purpose as will be described. The left end $g^2$ of the spindle is squared and recessed.

The rotor or spindle G carries adjacent the mandrel chuck $g$, $g'$ the gripper C which holds the wire end closely adjacent to the mandrel during winding. Preferably the gripper cooperates with a fixed part of the mandrel chuck, such as the chuck piece $g'$, Fig. 2 showing the gripper open and Fig. 3 showing the wire end gripped beneath the gripper upon the chuck piece. The gripper is shown mounted for closing by a swinging movement, pivoting on a pin $c$ in the recess in the squared end $g^2$ of the spindle. The gripper operating connections will be subsequently described.

The spindle G to the right of its squared left end comprises a hollow cylindrical portion $g^3$ and to the right of that a reduced portion $g^4$ which, as Fig. 14 shows, engages within the ball bearing 27. To the right of this bearing the spindle carries a clutch and stop enlargement or attached collar $g^5$ with clutch teeth $g^6$ at its right end and with an underneath stop notch or shoulder $g^7$. The teeth $g^6$ form part of a clutch I, and the shoulder $g^7$ cooperates with a stop or dog J, both later to be described. Beyond these parts the spindle part $g^4$ is surrounded by a power member or sleeve H to be described, and to the right thereof the spindle has a further reduced portion $g^8$ turning in the right hand bearing 28, and finally a threaded portion $g^9$ receiving a nut $g^{10}$ by which the spindle is tightly clamped to the inner race of the bearing 28. In using the term spindle for the rotor or member G on which the mandrel is centered and held it is intended to include any kind or shape of rotary member adapted to hold and rotate the mandrel and to be driven from the power source in one part of the complete cycle and stopped and held during the remainder of the cycle.

The gripper C holds the wire against the mandrel and these parts are turned bodily by and with the spindle G. The gripper is pivoted at $c$ within the squared end of the spindle, and to the right of its pivot it has an extension or tail $c'$ by which it may be swung or tilted through a small angle to close and open it. The gripper tail is engaged by a cam or wedge block $c^2$ slidable longitudinally within the spindle, the block having a longitudinal groove engaged by an inwardly projecting pin $c^3$ preventing relative turning of the block. The block or cam $c^2$ has a rightwardly extending stem $c^4$ running through the balance of the length of the spindle and at its exterior right end carrying a head or contact piece $c^5$. Between the spindle end part $g^9$ and the stem head $c^5$ is shown a strong coil spring $c^6$ under compression, tending to move rightwardly the cam $c^2$ and close the gripper. For opening the gripper by thrusting leftward on the head $c^5$ there is shown an adjustable contact $c^7$ carried at the top end of a rocking lever $c^8$. Examining Fig. 6 the lever $c^8$ is shown to be fulcrumed at $c^9$ on the table 26, its lower arm extending below the table and carrying a follower or roll $c^{10}$ by which the lever may be swung by the rise $c^{11}$ of a cam $30^c$ on a cam shaft 30 to cause the opening of the gripper. To minimize wear a spring $c^{12}$ may normally retract the lever $c^8$ sufficiently for slight separation between contacts $c^5$ and $c^7$, as Fig. 6 shows.

For effecting timed actuation of the gripper operating and various other connections there is shown a main or cam shaft 30 running longitudinally beneath the table, turning in bearings 31, and carrying a system of actuating and timing devices or cams for effecting various operations. Among these is the aforesaid cam $30^c$ cooperating with the follower $c^{10}$ of the gripper connections. This is shown as a face cam having an elevated portion $c^{11}$ throwing rightwardly the lower arm of the lever $c^8$, thus at the proper instant to open the gripper, as the wire is being positioned beneath it, and thereupon to cause its closing by spring $c^6$ to grip the wire, the timing thereof having been indicated in the schedule of steps recited hereinabove. Further cams on the shaft 30 and their several controls will be described in connection with the respective parts controlled thereby.

The entire power of the machine may be derived from a single source, namely, through the aforesaid rotary member H designated for convenience a power sleeve, surrounding and rotating loosely on a middle portion of the spindle G. The power member or sleeve is provided with a belt pulley $h$ engaged by a belt $h'$ driven from a suitable source as a regulable electric motor, delivering a high speed to the power sleeve and thence to the spindle and mandrel when clutched thereto. The power sleeve is formed also with a groove $h^2$ engageable by a shipper M controlled by a member K as will be described. At its left end the sleeve H carries clutch teeth $h^3$ cooperating with the teeth $g^6$ of the spindle, these cooperating teeth constituting a clutch I, for positive drive of the spindle during the winding.

The cam shaft 30 may derive its rotation from the power sleeve H, which carries a spur gear $h^5$ for this purpose. From said gear is driven a train of gearing involving much reduction of speed, so that the shaft turns relatively very slowly; see Figs. 1, 6 and 10. Thus the high speed gear $h^5$ on the power sleeve engages a larger gear 33, and turning with the gear 33 is a smaller gear 34. Gears 33, 34 are mounted on a short axle or stud 35 adjustable in position, so that the gears may be interchanged to change the ratio and the shaft and gears may be reset as required. The stud is adjustable vertically in a slotted part 36 of a bracket 37 horizontally adjustable on the table 26, each adjustment being fixed by set screws or nuts as shown. The gear 34 engages a larger gear 38 mounted on a rear countershaft 39 turning in bearings 40 beneath the table, the table being apertured for the meshing of the gears. The shaft 39 extends rightward and there carries a small bevel gear 41 which engages a large bevel gear 42 on a horizontal cross shaft 43 turning in bearings 44. To cause still further speed reduction the shaft 43 carries a small bevel gear 46 in mesh with a large bevel gear 47 on the main or cam shaft 30.

As an example of ratios and dimensions in the production of a helically wound filament for a minature lamp the following may be given. The winding mandrel may be of .008 inch diameter and the filament wire .002 inch diameter. The filament may be wound into a coil of 36 convolutions, and these being open or out of contact the length of the wound helix may be about .13 inch, with extending straight wire ends or leads of .10 inch. While the complete cycle of operations may be considerably under three seconds, that speed will be taken as representative, the cam shaft 30 thus turning 20 R. P. M. The power member or sleeve H may be driven at 1440 R. P. M., so that the reduction gearing $h^5$, 33, 34, 38, 41, 42, 46 and 47 will give the ratio 72 to 1. The winding operation when producing 36 convolutions will require 1.5 seconds or about half of the complete cycle. The cam shaft control determines the start and stop of winding and therefore the portion of the cycle occupied by the winding, and as well the timing of the various intervening operations, including the forming of a straight wire stretch, its bending parallel to the axis, its severing midway between two products, the removal of the product from the mandrel and the restoration to initial position, as in the illustrative cycle of events already hereinabove scheduled. It is manifest that by interchanging the combined gears 33, 34 for others of different diameters the speed ratio between power member H and the cam shaft 30 may be varied at will, and that the driving speed of the power sleeve may be coordinately varied, as by motor regulation, so that the complete cycle or one turn of shaft 30 may be maintained at three seconds or other desired period, with the net result of such readjustments that the mandrel speed is altered, and the number of convolutions in the product thus predetermined. The character of the product may be otherwise varied at will, as by the interchange of the mandrel for one of different diameter, changing the filament wire, and adjusting various of the operations, for example to predetermine the length of the straight ends or leads of each complete product or filament.

The stop device or member J is arranged above the table 26 in front of the spindle collar $g^5$ to cooperate with the stop shoulder $g^7$ of the collar in bringing the spindle to a positive stop in a predetermined position at the end of the winding operation, see Figs. 1, 6, 14 and 17. The stop device is shown in the form of an arm swingable upwardly into stopping position as in Figs. 14 and 17 and downwardly to permit spindle rotation. The stopping part or contact is shown as a dog $j$ of hardened steel receiving the impact of the stoppage. The stop dog is fitted within the rear end of a shank $j'$, the forward end of which is mounted on a horizontal fulcrum or axle $j^3$ supported in blocks $j^4$ attached upon the machine table, so that the free or rear end of the stop device can swing down and up.

It is preferable to cushion the stop dog $j$ and for this purpose the shank is formed with an interior recess $j^6$ in which the dog slides, with a strong cushion spring $j^7$ resisting the yielding of the dog under impact. The normal position of the dog is determined by a limiting pin $j^8$ threaded into the front side of the dog with its enlarged head accommodated in a recess $j^9$ near the front end of the shank.

For lowering and raising the stop device there is shown pivoted to the dog $j$ a depending link $j^{11}$. The lower end of this link is formed into a fork $j^{12}$ receiving a portion $m^8$ of the shipper lever M. Each side of the link fork is formed with a slot $j^{13}$, these receiving a pin $m^9$ extending through the shipper part $m^8$. The link $j^{11}$ is shown hollow and accommodates a spring $j^{15}$ under compression, the lower end of the spring bearing down on the shipper part $m^8$. The spring $j^{15}$ thus thrusts upwardly upon the link and stop device, tending to raise the latter into stopping position. When the shipper swings however to lower the pin $m^9$ the pin descends through the slot $j^{13}$, and reaching the end of the slot, its further descent pulls down the link and lowers the stop dog J sufficiently to permit rotation of the spindle by the clutch I.

The shipper lever M which controls the clutching and unclutching and stopping of the spindle G is best illustrated in Figs. 6 and 14 and appears also in Fig. 1. The shipper has several arms extending from a hub $m'$ fulcrumed upon a cross axle 32 mounted in a block attached to the machine table, so that the shipper can oscillate about a horizontal axis to effect the described control. For operating the clutch I by moving the sleeve teeth $h^3$ toward and from the spindle teeth $g^6$, the shipper has an upwardly extending arm $m^4$, preferably in the usual form of a yoke straddling the sleeve H, and with pins or studs $m^5$ projecting into the groove $h^2$. In said figures the arm $m^4$ stands rightward and the clutch is open.

The shipper M has also a leftward extending arm $m^7$ for controlling the spindle stop J. Attached upon the front side of the arm $m^7$ is a bent plate or bracket $m^8$, already mentioned, extending upwardly into engagement in the fork $j^{12}$ of the stop dog operating link, the plate $m^8$ having a cross pin $m^9$ entering the closed slot $j^{13}$ as already described; so that the complete lowering of the shipper arm may pull down the spindle stop, which otherwise is held up by spring $j^{15}$ in its operative position. The shipper oscillation is through a small arc indicated by the full and dotted lines at its left extremity of the arm $m^7$. The end of this arm has a locking extension or finger $m^{10}$ whose purpose will be described.

The shipper may be swung or oscillated by means of cushioned or spring connections thus permitting timed control through the finger $m^{10}$. The shipper has a depending arm or yoke $m^{12}$, the opposite lugs of which carry an elongated rod $m^{13}$ surrounded by two helical springs $m^{14}$. Loose on the rod between the springs is a double socket $m^{15}$ which may be thrust right and left to cause yielding shipper movements, through the springs. This operation may be effected by an arm $m^{16}$, the hub $m^{17}$ of which is loose on the axle 32, the arm carrying directly the double socket piece $m^{15}$, pivoted or rigid thereon. For swinging the arm its lower free end is provided with a follower or stud $m^{18}$ which is entered in the groove $m^{19}$ of a cam $30^m$ on the cam shaft.

The shift movements of the shipper are controlled by a timing member or controlling lever K. The slow turning of shaft cam $30^m$ charges the springs $m^{14}$ alternately while the controller K through its locking lug $k$ holds the shipper against shift until, upon retraction of the controller the shipper is released, to reverse quickly its position and become again locked. Thus an accurately timed control for quick shipper movements and reversal of clutch and stop is afforded.

The lock finger or projection $m^{10}$ of the shipper may be locked in either its raised or lowered position by means of the lock member or lug $k$ projecting rightwardly from the top of the locking lever K. As Fig. 14 shows, when the lock $k$ is in its right hand position it will lock the arm $m^7$ and finger $m^{10}$ in either the raised or the lowered position, by cooperation respectively of the upper side of the lug $k$ with the lower side of the finger $m^{10}$ or of the lower side of the lug with the upper side of the finger. To afford this result the combined thicknesses of the lug and finger equal the required difference in elevation of this extremity of the shipper arm in its two positions. This gives a shipper throw corresponding to that needed to close and open the clutch I. The arm or controller K therefore need only be retracted leftwardly to release the shipper and permitting its spring-effected oscillation from one position to another.

The shipper lock lever K for these purposes is fulcrumed at its lower end at $k'$ on a bracket 59 depending from the machine table, and for its operation the lever or controller is provided with a follower or cam operated contact piece $k^3$. A spring $k^4$ pulls rightwardly the lock lever, thereby pressing the contact piece toward a cam $30^k$ mounted upon the shaft 30, said cam being in the form of a disk having at its left face a first rise $k^6$ and a second rise $k^7$ each adapted to thrust leftwardly on the follower and thus retract the lock member K from locking position. By these arrangements, when the first cam rise retracts the controller the shipper is oscillated counter-clockwise to release the spindle from the stop J and to cause the quick closing of the clutch I by one spring $m^{14}$, the second rise of the cam permitting the quick reverse shift by the other spring to unclutch and stop the rotation at the end of the winding period. The cam $30^k$ therefore affords a very reliable means of timing the shipper operations.

Referring next to the wire guide B, the function of this is to conduct the supplied wire to the other instruments and to direct and manipulate it according to the described cycle. The guide is shown detached in Figs. 4 and 5 where it is seen to comprise a movable guide member or jaw $b$ and a relatively fixed jaw $b'$, between which the filament wire may be drawn under the light frictional pressure of the jaws, affording tension. The guide is shown in the general Figs. 1, 6 and 10 and in the diagrams Figs. 22 etc., with special Figs. 18 to 21 showing the details.

Having several kinds of movements during the cycle the wire guide is mounted by means of a train of successive supporting members which may for convenience be termed, respectively, the block or guide support N, the carrier P upon which the block is movable and the carriage Q upon which the carrier is movable, the carriage itself being movable upon the machine frame or table. This multiple mounting affords the means of giving to the guide the following pairs of movements already referred to; first, its inward movement to present the wire to the mandrel and gripper, and its return frontward movement, the extent of which determines the amount of wire drawn through the guide between successive windings; second, its leftward or advancing movement for the feed of the wire along the mandrel, to determine the pitch of the produced helix, and subsequently its return or rightward movement; and thirdly, the wire bending movement, or shifting around in an arc leftward and inward, after the frontward retraction, in order to bend the straight stretch of wire parallel to the winding axis, followed, after the severing, by the return arcuate movement. While these cooperative movements may be apportioned to the block, the carrier and the carriage in various ways, the movements are specifically shown as provided as follows; the block with guide having the in and out or back and front movement, the carrier P having the arcuate or wire bending movement, and the carriage Q having the axial or longitudinal feeding movements. The movements are preferably separate and successive; but they may slightly overlap, the front retraction of block commencing just before the left travel of carriage ceases, and the arc movement of the carrier commencing just before the completion of the front retraction of the block; while on return the carrier and carriage movements may more extensively overlap. With these considerations in mind the details of the preferred structure may be described as follows.

Upon the block or support N of the wire guide the movable jaw $b$ is swingable toward and from the jaw $b'$ which is fixed on the block. Attached to the block or fixed jaw is shown a light bracket $b^2$ carrying an eye $b^3$ leading the wire from the supply or spool $b^4$ to the jaws of the guide. The jaw $b$ is rendered movable by pivoting upon a post or pin $n$ upstanding from the block N. The jaw pressure for wire tension is afforded by a coil spring $b^5$ having one end attached to the movable jaw and the other end anchored in a collar $n'$, the latter being adjustably secured to the upper part of the post so as to determine the spring pressure and tension.

To provide for the transverse or inward and outward movements of the wire guide, the block N is shown as formed with an underneath enlargement or dovetail foot $n^3$ which is set down into a recessed portion of the carrier P and held down and guided thereon by overhanging guide bars or rails $p$. The inward position of the guide relative to the mandrel is determined by a stop screw $n^8$ to be described. For causing the in and out sliding movements of the block upon the carrier, without interference by longitudinal movements of the carrier as will be described, the block is formed with a longitudinal engaging means in the form of a groove $n^4$, conveniently open above, and accommodating an actuating bar $n^5$.

A convenient train of mechanism by which the bar $n^5$ moves the block N in and out upon the carrier P may be as follows. A bellcrank lever $n^6$ is mounted on a bracket $p'$ upstanding from the carrier, the bellcrank carrying the bar $n^5$ at the lower end of its depending arm. The front arm of the bellcrank is formed into a head $n^7$ by which the actuation is effected. The bellcrank depending arm carries a stop screw $n^8$. A spring $n^9$ is attached to the rod $n^5$ or to the bellcrank arm and is held under rearwardly pulling tension by attachment of its rear end upon the carrier, thus tending both to slide the block N rearward and to depress the front end or head $n^7$ of the bellcrank. This rearward movement is limited by the screw $n^8$ meeting a relatively fixed stop $n^{10}$ on the bracket $p'$. Adjusting the stop screw thereby determines the winding relation of the wire guide to the mandrel.

To swing the bellcrank $n^6$ and thus cause fore-and-aft movements of the block N and wire guide, the head $n^7$ may act as a valve tappet in cooperation with a contact screw $n^{11}$ atop a long upright connecting rod or slide $n^{12}$. The sliderod $n^{12}$ slides in the table as a bearing. The adjusting screw $n^{11}$ at its top end may have a flat top surface, while the underside of the cooperating head $n^7$ is rounded.

To lift the rod $n^{12}$ for actuating the block its lower end is pivotally connected to a lever arm $n^{13}$, Fig. 10, extending frontwardly from an axle 49 on which it is fulcrumed, this axle being mounted upon a bracket 50 depending from the machine table. The lever has also an upwardly slanting arm $n^{14}$ having a follower or roll $n^{15}$ at its extremity arranged to engage the cam portion or shaped periphery of a cam disk $30^n$ on the cam shaft 30. The timing of the cam $30^n$ therefore determines the in and out or fore-and-aft movements of the wire guide.

Referring next to the carrier P and its curvilinear movements and actuating means, the carrier is shown in the form of a plate, substantially oblong, resting and slidable flatly on top of the carriage Q, which also is in the form of a flat plate. As the carrier is to have movements with both longitudinal and lateral components, it is movable freely over the carriage, and is confined upon the carriage by hold-down strips $q$, mounted above the carriage by spacing walls or bars $q'$. The arcuate bending movement of the carrier is preferably leftward and inward to the extent of about a quadrant or 90°, and to limit and determine the return movement, and thereby the total movement, the right hand carriage wall $q'$ is shown provided with adjustable stop screws $q^2$. The carrier as already stated is recessed to receive the block N, having rails $p$ to confine the block, and having an upstanding bracket $p'$ to support the bell crank $n^6$.

For actuating the carrier P to receive its arcuate movements it is shown as bored with vertical holes $p^2$, to receive actuating pins $p^3$. Two of such holes and pins are sufficient to afford the arcuate movements, wherein preferably the carrier does not swing, but moves with pure translation. To secure this result the actuating pins $p^3$ are moved in parallel paths. For example, they may constitute crank pins, upstanding from crank disks $p^4$, which are also peripherally toothed through at least part of their circumferences to constitute gears or segments. The two cranks stand always in parallel relation, the gears being of equal size, each mounted in a circular recess $q^3$ in the carriage, and both engaged by a common actuating rack $p^5$ sliding horizontally through a way $q^4$ in the carriage. A spring $p^6$ pulls rearwardly the rack $p^5$ thus tending to rotate the crank pins frontward and rightward to the position shown in full lines in Fig. 21, thus retracting the carrier into contact with the stops $q^2$. This figure in dotted lines shows also the shifted cranks, and Fig. 18 indicates the resultant shift of the wire guide B. It is therefore only necessary to shift frontwardly the rack $p^5$ to bring about the wire-bending arcuate movement of the guide, opposed by the spring $p^6$.

The connections for shifting the rack $p^5$ to put the wire guide through its arcuate or quadrantal motion include a projecting pin $p^7$ near the rack front end, this pin being engaged by the depending arm $p^8$ of a bellcrank lever pivoted upon an upstanding bracket $q^5$ of the carriage. The front arm $p^9$ of the bell crank is formed with a head $p^{10}$ crowned at its lower side to cooperate, like a tappet, with the adjustable head $p^{11}$ at the upper end of a long upright sliderod $p^{12}$ by the lifting of which the bellcrank may be swung in opposition to the spring $p^6$. These parts are similar to the bell crank head $n^7$ and head $n^{11}$ of sliderod $n^{12}$ already described. Passing to Figs. 6 and 10 the lower end of the rod $p^{12}$ is shown pivoted to the front arm $p^{13}$ of a cam lever fulcrumed on the axle 49, said lever having also an upwardly extending arm $p^{14}$ carrying at its extremity a follower or roll $p^{15}$ running upon the cam surface or shaped periphery $p^{16}$ of a cam or disk $30^p$ on the shaft 30.

Referring next to the carriage Q, which shifts progressively leftward to feed the guide during the winding of the helix, this is constructed as a flat plate slidable upon the frame table 26. Reference has already been made to the carriage end walls $q'$ supporting strips $q$ to hold down the carrier P, and to stop screws $q^2$ to limit the carrier; also recesses $q^3$ for the crank disks $p^4$, and the way $q^4$ for the rack $p^5$ and the bracket $q^5$ to support the lever $p^8$. For confining the carriage to a definite longitudinal path it is formed with an undercut recess $q^7$, best seen in Figs. 19 and 20, this being engaged upon a dovetail guide 29 attached rigidly upon the table. To take up looseness the carriage recess contains a gib $q^8$ adjustable inwardly by accessible screws $q^9$.

To cause the leftward feeding and rightward return movements of the carriage the following connections are illustrated. At its left end the carriage has a projecting lug $q^{11}$ to which is attached a spring $q^{12}$ pulling leftward. From the lug $q^{11}$ depends a post $q^{13}$, the lower end of which carries a follower $q^{14}$ engaging the cam surface $q^{15}$ of a cam or disk $30^q$ on the shaft 30. This cam is designed to coordinate with the other cams, and causes the carriage and the wire guide to travel leftward at the desired speed during winding upon the mandrel, the cam subsequently effecting the return or rightward movement of the carriage, all according to the cycle already stated. At its rear side the carriage is formed with a vertical way $q^{16}$ to receive the mandrel rest shank $d^4$, and provided with an attached block $q^{17}$ to confine the shank, as will be next described.

The movements of the mandrel rest or bearing member D comprise primarily a retraction or disengagement from the mandrel to permit each product to be removed, with subsequent return to position to engage and steady the mandrel before and during the next winding; and secondarily a preferred leftward travel partaking of the feed progress, so that the rest functions substantially at the point of laying the convolutions, coming to rest at the end of its travel as the winding and feed stop; but manifestly the rest might be stationary during winding, giving support only to the free end of the mandrel. The travel of the rest with the feeding advance is simply effected by mounting its shank in the wire guide carriage Q as just above described.

In detail the rest D is best shown in Fig. 11 and Fig. 22, etc. It consists of a thin stiff plate having at its top end a notch $d$ to receive the mandrel. This notch is partly enclosed between a high rear portion or horn $d'$ and a low front horn $d^2$. When in position therefore the mandrel is braced against rearward, frontward or downward displacement; and the rest is readily adapted to retraction by mere lowering, rather than by endwise disengagement from the mandrel. Also the rear horn $d'$ is well adapted to act as a bending abutment, about which the wire may be bent parallel to the mandrel, and the front horn being low does not conflict with this operation. The rest so constructed is shown as standing upwardly from a body portion or block $d^3$ which is screw-attached to a vertical shank $d^4$ which slides in the way $q^{16}$ in the carriage as already described. The shank $d^4$ extends downwardly slidingly through the carriage and freely through an enlarged hole in the table 26, and at its lower end carries a lateral flange $d^5$, affording a contact or stop cooperating with a screw stop $d^6$ threaded into the confining block $q^{17}$. By this means the raised or operative position of the mandrel rest can be accurately determined in relation to the mandrel.

Suitable connections for lifting and lowering the mandrel rest may be as follows. Near its lower end the shank $d^4$ has a horizontal bore engaging slidably upon a pivot pin $d^8$, the ends of the pin being attached to the arms of a yoke $d^9$ provided at the top end of a depending link $d^{10}$. By this means the link may transmit vertical movements to the shank and rest while permitting longitudinal travel thereof. The lower end of the link $d^{10}$ is connected by a pivot pin $d^{11}$ with a lever arm $d^{12}$ fulcrumed on a stud or axle 51 attached to the frame bracket 50. The cam lever $d^{12}$ carries a follower or roll $d^{13}$ bearing upon the underside of the cam periphery $d^{14}$ of a cam disk $30^d$ on the shaft 30. In opposition to the cam the mandrel rest and parts extending to the lever $d^{12}$ may be pressed upwardly by a spring $d^{15}$. By these means the rise of the mandrel rest and its subsequent lowering are coordinated with its leftward travel during winding and subsequent rightward return to initial position.

The severing device E appears on the diagram Figs. 25 and 25$^a$ and is separately shown in Figs. 12 and 13. Any kind of severing means may serve but a mechanical cutting device is preferred, and that shown comprises opposed shear blades $e$ and $e'$ carried respectively on upper and lower swinging arms $e^2$ and $e^3$. Said arms have hubs mounted upon a common axle $e^4$ projecting leftwardly from a fixed bracket 53 upstanding from the machine table. The blade carrying arms are shown as having rear extensions $e^5$ and $e^6$ beyond the fulcrum, by which the blades may be swung from the dotted line to the full line position shown in Fig. 12. A simple linkage is completed by upper and lower links $e^7$ and $e^8$ which have a common pivot $e^9$ at the top of a vertical lever $e^{10}$ shown also in Fig. 10. This lever is fulcrumed on an axle 52 on the bracket 50, and it has a frontwardly extending arm $e^{11}$ shown also in Fig. 6 which carries a follower or roll $e^{12}$ bearing upwardly at the underside of the cam periphery $e^{13}$ of a cam or disk $30^e$ on the shaft 30. Against the resistance of a spring $e^{14}$ the cam therefore, at a proper point of time, swings frontwardly the lever $e^{10}$ and thereby throws the severing blades into action to shear midway the straight stretch of wire that has been bent parallel to the axis of winding.

The outfeeder F is arranged to pick up the completed product and slide it from the mandrel by a bodily retracting movement, and then to swing it away from the winding point and carry it to a delivery point. The outfeeder is shown separately in the greatly enlarged Figs. 7–9, and its connections appear in Figs. 1, 6 and 10. It comprises two hook-like engagers $f$. Each engager comprises a left hand plate $f'$ and a right hand plate $f^2$, each composed of thin metal, the two standing upright side by side so that one is slightly offset with respect to the other, namely, by an amount approximately the same as the pitch of the wound helix, each plate being thin enough to enter between two convolutions. The hooking or engaging effect is produced by shaping the thin plates to afford cooperating slants together constituting a V-notch. Thus the plate $f'$ has a slant $f^3$ facing frontward and the plate $f^2$ has a complementary slant $f^4$, these slants converging downwardly. As these figures show, each of the two engagers is thus able to enter the convolution spaces at the front and rear sides, affording a secure engagement by which the product is delicately held as it is slid from the mandrel in the retraction of the outfeeder. The outfeeder thus constituted may be assembled by means of a spacing block $f^5$ between the two engagers and a clamping block $f^6$ beyond the right hand engager, with a securing bolt $f^7$ extending through the blocks and through the engagers and also through the free extremity of a retractible carrier or arm R. Thereby the complete operations of the outfeeder may be effected by actuation of the carrier or rock arm.

The outfeeder carrier R is in the form of a rock arm attached to a rockshaft $r$ turning in bearings $s$ on a carriage S, to be described. The rockshaft $r$ carries a second rock arm $r'$, at the free extremity of which is an adjustable contact screw $r^2$ located at the axis of swinging of the carriage S, and which is adapted to be lifted and lowered to bring about corresponding movements of the outfeeder F. For accurately lifting the rock arms R and $r'$ to engage the product at the proper time, there is shown a vertical rod $r^3$ sliding within a sleeve $s'$. The lower end of the rod rests upon the rear arm $r^4$ of an actuating lever which is fulcrumed on the axle 49 and has a frontwardly extending arm $r^5$ carrying a follower or roll $r^6$ bearing upwardly against the cam surface or periphery $r^7$ of a cam or disk $30^r$ on the shaft 30.

The shifting of the outfeeder F to and from a position beneath the mandrel is effected by the horizontal rocking of the carriage S. The carriage has bearings $s$ already referred to supporting the rockshaft of the carrier R. The carriage S is shown as a swingable member having its hub attached to the top end of a rocksleeve $s'$ already mentioned, which extends downwardly through a fixed bearing 55 above the machine table and a similar bearing 56 below the table, the sleeve having a lower collar or hub $s^2$ below the lower bearing. For swinging the carriage S the sleeve lower hub $s^2$ is provided with a rearwardly extending rock arm $s^3$ shown as connected by a long longitudinal link $s^4$ with the rear arm $s^5$ of a cam lever fulcrumed at the foot of a depending bracket or post 57. The cam lever has a front arm $s^6$ carrying a follower or roll $s^7$ engaged in the cam groove $s^8$ of a cam or disk $30^s$ on the shaft 30. By these coordinated connections the outfeeder is swung bodily inward and outward, and is raised and lowered, in accordance with the cycle of operations, already recited.

The described or other outfeeder operates to remove the product from the mandrel, transport it away to a convenient point for discharge, whether manually or by a dumping action, or for transfer to another operation. For example, the outfeeder F, when it has carried the product to a remote point, may there discharge it by a relative lowering movement adjacent to an abutment which relatively lifts one of the projecting leads and so tilts the product until it falls off; or the outfeeder by a shift or rise may carry the filament to position with its two leads entering the hooked or bent ends of the leads of a lamp mount, suitably supported, so that by a pinching action the mounting operation is completed.

The active instruments A to F having been described, and the prominent mechanical members G to S through which they are operated it only remains to describe more fully the operating and timing devices or cams, shown mounted on the shaft 30. They include, in order, cam $30^n$ which moves block N and guide B inward toward mandrel A; cam $30^c$ which closes the gripper C on the wire; cam $30^m$ which charges the spring of shipper M and cam $30^k$ which through controller K times the shipper movements, closing the clutch I and later opening it and applying stop J; cam $30^q$ which shifts carriage Q to feed the guide and wire along the mandrel during winding; cam $30^p$ which puts the carrier P and guide through an arcuate wire-bending movement; cam $30^e$ which operates the severer E; cam $30^d$ which lowers the mandrel rest D; cam $30^s$ which swings carriage S to bring the outfeeder F to the product, and cam $30^r$ which then lifts the carrier R for engagement of outfeeder with the product. The contours of the several cams are generally indicated, giving these and the complementary movements, but the several cams are not completely illustrated, as their contours may be determined as a matter of machine design, to give the coordinated actions or their equivalents as already hereinabove fully indicated.

What is claimed is:

1. A coil filament making machine comprising in combination, a rotary mandrel adapted to be free at one end and upon which by its rotation the filament wire is wound, a spindle with chuck holding the other end of the winding mandrel, drive means for rotating the spindle during winding and having a clutch for causing rotation and stop means to bring the spindle to rest in a definite position when unclutched, a gripper on the spindle for holding the first end of the wire adjacent to the mandrel during winding, a wire guide through which runs the wire from a supply to the mandrel under tension, timed connections to shift the guide to and from the mandrel and longitudinally thereof in a manner to cooperate in applying the wire to the gripper and in advancing or feeding with the progress of the winding to form a helix and in forming and bending a straight stretch of wire into longitudinal position after winding, a severer having timed means operating it to sever midway the bent stretch of wire, thus detaching the wound filament from the supply, a retractible rest for the free end of the mandrel adapted to give it bearing during winding, bending and severing and having timed means to retract it thereafter, and an outfeeding device having timed means to shift it adjacent to the mandrel and to engage the detached coil when the rest is retracted and to slide the coil from the mandrel and transport it to a delivery position.

2. A machine as in claim 1 and wherein, after the winding is completed, the guide is retracted to form a straight stretch of wire and is moved along an arcuate path for the bending of said straight stretch into substantial parallelism with the mandrel.

3. A machine as in claim 1 and wherein, after the winding, the mandrel rest operates as an abutment about which the straight stretch of wire is bent into longitudinal position.

4. A machine as in claim 1 and wherein the mandrel rest, during winding, is caused to travel along the mandrel in substantial unison with the feeding advance of the guide.

5. In a coil filament making machine the combination of a rotary winding mandrel having means to rotate it for the winding of the filament wire and to stop it in a definite position, a wire-end holder rotating with the mandrel and adapted to hold the first end of the wire adjacent to the mandrel during winding, a wire guide having means to move it inward to present the wire end to the holder and then to feed the wire along the mandrel during winding, and drive means with connections automatically operating said mandrel, holder and guide in coordination.

6. In a coil filament making machine the combination of a rotary winding mandrel, a rotor carrying the mandrel and having means to rotate it for the winding of the filament wire and to stop it in a definite position, a wire-end holder or gripper mounted on and rotating with the rotor and adapted to hold the first end of the wire adjacent to the mandrel during winding and to release it after winding, a wire guide mounted to move inward and outward toward and from the mandrel and to travel or feed along the mandrel and having means to move it inward to present the wire end to the holder and then to feed the wire along the mandrel during winding, and drive means with connections automatically operating said rotor and guide in coordination.

7. In a coil filament making machine the combination of a rotary winding mandrel, a spindle carrying the mandrel and having means to rotate it for the winding of the filament wire and to stop it in a definite position, a wire-end gripper mounted on and rotating with the rotor and having means to close it to hold the first end of the wire adjacent to the mandrel during winding and to open it subsequently; a wire guide mounted to move inward and outward toward and from the mandrel and to travel along the mandrel and having means to move it inward to present the wire end to the gripper and to feed it along the mandrel during winding, and drive means with connections automatically operating said rotor, gripper and guide in coordination.

8. A machine as in claim 5 and wherein the mandrel has one end free for and during the removal of the coiled filament therefrom.

9. A machine as in claim 7 and wherein the gripper comprises a jaw pivoted on the rotor, with operating connections mounted partly on the rotor and partly independently.

10. In a coil filament making machine the combination of a rotary winding mandrel having means to rotate it for the winding of the filament wire and to stop it in a definite position, a wire-end holder adapted to hold the first end of the wire adjacent to the mandrel during winding, a wire guide mounted on a block fitted to move inward and outward toward and from the mandrel, and said block mounted on a carriage fitted to travel along the mandrel, and automatic means to move the block and guide inward to engage the wire end with the holder and then to feed the carriage and guide along the mandrel during winding.

11. In a coil filament making machine the combination of a rotary winding mandrel having means to hold it axially and rotate it for the winding of the filament wire and then to stop it in a definite position, a wire-end holder adapted to hold the first end of the wire adjacent to the mandrel during winding, a wire guide mounted to move inward and outward toward and from the mandrel and to travel along the mandrel, means to move the guide inward to present the wire end to the holder and then to feed it along the mandrel during winding, and a rest or bearing for one end of the mandrel to steady it during winding, said rest being retractible or disengageable after winding to permit the removal of the coiled filament from the mandrel.

12. A machine as in claim 11 and wherein the mandrel rest comprises a notched member retractible laterally or by lowering.

13. A machine as in claim 11 and wherein the mandrel rest is caused to travel along the mandrel ahead of the winding.

14. A machine as in claim 11 and wherein the mandrel rest is caused to travel along the mandrel ahead of the winding, namely, by connection with the means that feeds the guide.

15. A machine as in claim 10 and wherein is a mandrel rest adapted to steady the mandrel during winding and mounted on said carriage to travel along with the guide.

16. A machine as in claim 11 and wherein the mandrel rest is caused to travel along the mandrel ahead of the winding, and then stops and serves as an abutment for bending the wire.

17. In a coil filament making machine the combination of a rotary winding mandrel having means to hold it axially and rotate it for the winding of the filament wire and then to stop it in a definite position, with means to hold the first end of the wire adjacent to the mandrel during winding, a wire guide mounted for movement inward and outward toward and from the mandrel and longitudinally of the mandrel, means to move the guide inward to present the wire end to the holder, and then to feed it along the mandrel during winding, and then to shift to draw a length of wire through the guide and to bend such length parallel to the mandrel, and a rest or bearing for one end of the mandrel adapted to steady the mandrel during winding and then to stand as an abutment for such bending of wire length and then to retract after bending to permit the removal of the coiled filament from the mandrel.

18. In a coil filament making machine the combination of a rotary winding mandrel having means to hold it axially and rotate it for the winding of the filament wire and then to stop it in a definite position, with means to hold the first end of the wire adjacent to the mandrel during winding, a wire guide mounted for movement inward and outward toward and from the mandrel and longitudinally of the mandrel, means to move the guide inward to present the wire end to the holder, and then to feed it along the mandrel during winding, and then to shift to draw a length of wire through the guide and to bend such length parallel to the mandrel, and a member adapted to stand as an abutment for such bending of wire length and then to retract after bending to permit the removal of the coiled filament from the mandrel.

19. A machine as in claim 18 and wherein is severing means operable to sever such length of wire after bending.

20. In a coil filament making machine the combination of a rotary winding mandrel having means to hold it axially at one end and rotate it for the winding of the filament wire and then to stop it, a wire guide having means to feed it along the mandrel during winding, and then to retract to draw a length of wire, means operable thereupon to sever such length of wire, leaving the product on the mandrel, outfeeding means comprising an engager movable toward the mandrel to engage the coiled filament thereon and then longitudinally to slide the product from the mandrel, and connections to so operate said engager after such severing of the product.

21. A machine as in claim 20 and wherein the engager is adapted to engage between convolutions of the coil of the product and is lifted accurately to so engage it before axial retraction.

22. A machine as in claim 20 and wherein is a movable carrier for the outfeeding engager, and a carriage for the carrier by which the product is transported to a point remote from the mandrel.

23. In a coil filament making machine the combination of a rotary winding mandrel having means to hold it axially at one end and rotate it for the winding of the filament wire and then to stop it, its other end being free, a wire guide having means to feed it along the mandrel during winding, and then to retract to draw a length of wire, means operable thereupon to sever such length of wire, leaving the product on the mandrel, a rest adapted to engage and steady the free end of the mandrel during winding with means thereafter to retract it leaving the mandrel free, outfeeding means comprising an engager movable toward the mandrel to engage the coiled filament thereon, and movable longitudinally after the retraction of the rest to slide the product from the mandrel, and connections to so operate said rest and engager after such severing of the product.

24. In a machine of the kind specified, in combination with a winding mandrel, and means to rotate and stop it, a wire guide, a block movable in and out and supporting the guide to move to and from the mandrel, a carrier on which the block is mounted and movable arcuately to shift the guide correspondingly after winding and thus bend a length of wire, and a carriage on which the carrier is mounted and movable longitudinally for feed during winding.

25. A machine as in claim 24 and wherein the mounting of the carrier on the carriage includes parallel cranks.

26. A coil filament making machine comprising operating instruments including a winding mandrel and a wire guide, a spindle carrying axially the mandrel, a shaft from which instruments are actuated or cam controlled, making one turn per cycle, a power member or sleeve drivable at high speed, reduction gear between said sleeve and shaft, a clutch between said sleeve and spindle for fast winding rotation of the mandrel during part of the cycle, a stop to arrest the spindle when unclutched, a shipper controlled from the shaft first to release the stop and close the clutch and later to open the clutch and apply the stop, means controlled from the shaft for feeding the wire guide along the mandrel during winding, and means controlled from the shaft for performing other operations during the part of the cycle when the wire is not being wound.

27. A machine as in claim 26 and wherein the shipper is operated by spring means in both directions, shaft means to charge the spring means alternately in both directions, a controller or shipper lock means to hold the shipper and then release it for quick shift, and shaft means to operate the controller.

28. In a coil filament making machine of the permanent mandrel type, means for rotating the mandrel during a part only of each cycle, means for presenting the wire to the mandrel and feeding it advancingly therealong to wind a helical coil, and after the winding has stopped bending a length of the wire advancingly along the axis of winding while holding the coil against displacement, and means for then severing the bent length of wire before removal of the wound coil from the mandrel.

29. The method of manufacture of coil filaments from a continuous wire supply, comprising securing the bent end of the supplied wire adjacent to a mandrel to form the first end of the coil, rotating the mandrel to wind the wire while advancing the wire along the mandrel until the desired length of helix is produced, bending a length of unwound wire longitudinally away from the helix into substantial parallelism with the mandrel while confining the wound helix against displacement thereon, severing such unwound bent length at a point to leave a straight wire extension on the second end of the coil and a similar bent length on the wire supply to be gripped adjacent to the mandrel for the next coil, and removing the completed coil from the mandrel.

30. The method of manufacture of coil filaments from a continuous wire supply, comprising gripping the bent end of the supplied wire adjacent to a mandrel to form the first end of the coil, rotating the mandrel to wind the wire while advancing the wire along the mandrel until the desired length of helix is produced, forming a length of unwound wire and bending it from the helix into substantially axial position while confining the wound helix against displacement, severing such unwound bent length at a midway point to leave a straight wire extension on the second end of the coil and a similar bent length on the wire supply to be gripped adjacent to the mandrel for the next coil, ungripping the first end of the wound coil to release it, and sliding the completed coil from the mandrel.

31. In an automatic coil filament making machine the combination of a permanent rotary winding mandrel having timed drive means to hold it by one end and rotate it in a fixed axial position for the winding of the filament wire and means to stop the drive and hold the mandrel in a definite rotated position, a gripper rotating with the mandrel to hold the first end of the wire adjacent to the mandrel during winding, a wire guide having timed actuating means to move the guide inward to present the wire end to the rotary mandrel and wire gripper, and then to feed it along the mandrel during winding to lay the wire helix, and then to retract to draw an unwound length of wire, and timed means operable thereupon to sever such length of wire.

32. A machine as in claim 31 and wherein the wire guide actuating means operates to retract the guide laterally from the axis to draw through it a length of wire and then shifts longitudinally and back to the mandrel to bend such wire length.

33. A machine as in claim 31 and wherein the mandrel while held at one end is adapted to allow the severed coil to be slid off from the free other end of the mandrel, and there is timed means so to remove each wound and severed coil from the mandrel before start of the winding of the next coil.

VICTOR ANDERSON.
DONALD G. TRUTNER.